(12) United States Patent
Cao (10) Patent No.: US 10,181,790 B2
(45) Date of Patent: Jan. 15, 2019

(54) DIRECT CURRENT VOLTAGE CONVERSION CIRCUIT AND LIQUID CRYSTAL DISPLAY DEVICE

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 194 days.

(21) Appl. No.: 15/118,873

(22) PCT Filed: Jun. 22, 2016

(86) PCT No.: PCT/CN2016/086782
§ 371 (c)(1),
(2) Date: Aug. 13, 2016

(87) PCT Pub. No.: WO2017/206217
PCT Pub. Date: Dec. 7, 2017

(65) Prior Publication Data
US 2018/0175729 A1    Jun. 21, 2018

(30) Foreign Application Priority Data
May 31, 2016   (CN) .......................... 2016 1 0377391

(51) Int. Cl.
*H02M 3/157*      (2006.01)
*G09G 3/36*       (2006.01)
(Continued)

(52) U.S. Cl.
CPC ........ *H02M 3/157* (2013.01); *G02F 1/13306* (2013.01); *G09G 3/36* (2013.01);
(Continued)

(58) Field of Classification Search
CPC ....... H02M 3/155–3/158; H02H 3/023; H02H 3/202; H02H 3/243; G02F 1/3306
(Continued)

(56) References Cited

U.S. PATENT DOCUMENTS 6,320,359 B1 * 11/2001 Nagaya ............... H02M 3/1588
                                                    323/224
8,198,838 B2 *  6/2012 Ou ......................... G06F 1/206
                                                    318/268
(Continued)

FOREIGN PATENT DOCUMENTS

CN      101086571 A     12/2007
CN      201611976 U     10/2010
(Continued)

*Primary Examiner* — Adolf D Berhane
(74) *Attorney, Agent, or Firm* — Andrew C. Cheng (57) ABSTRACT

A direct-current voltage conversion circuit and a liquid crystal display device are disclosed. The direct-current voltage conversion circuit includes a control chip, a conversion circuit and a protection circuit, wherein, the control chip is electrically connected to the conversion circuit, the control chip generates a control signal and an original voltage signal; the conversion circuit receives the control signal and the original voltage signal, and under a controlling of the control signal, obtaining a direct-current voltage signal according to the original voltage signal; the protection circuit detects if the conversion circuit generates an abnormality according to the direct-current voltage signal, and turning off the conversion circuit when the conversion circuit generates the abnormality.

16 Claims, 4 Drawing Sheets

(51) Int. Cl.
*H02M 3/156* (2006.01)
*G02F 1/133* (2006.01)
*H02H 3/02* (2006.01)
*H02H 3/20* (2006.01)
*H02H 3/24* (2006.01)
*H02H 7/12* (2006.01)
*H02M 1/00* (2006.01)

(52) U.S. Cl.
CPC ............ *H02H 3/023* (2013.01); *H02H 3/202* (2013.01); *H02H 3/243* (2013.01); *H02H 7/1213* (2013.01); *H02M 3/156* (2013.01); *G09G 2310/0243* (2013.01); *G09G 2310/0264* (2013.01); *H02M 2001/0012* (2013.01)

(58) Field of Classification Search
USPC .................. 323/265, 282–285, 349, 351
See application file for complete search history.

(56) References Cited

U.S. PATENT DOCUMENTS

| | | | |
|---|---|---|---|
| 9,413,262 B2* | 8/2016 | Yang | H02M 7/04 |
| 9,690,311 B2* | 6/2017 | Shih | G05F 1/577 |
| 9,837,896 B1* | 12/2017 | Amei | H02M 3/158 |
| 2005/0231127 A1 | 10/2005 | Yamamoto et al. | |
| 2017/0207699 A1* | 7/2017 | Nakata | H02M 3/156 |

FOREIGN PATENT DOCUMENTS

| | | |
|---|---|---|
| CN | 103295537 A | 9/2013 |
| CN | 103606884 A | 2/2014 |

\* cited by examiner

DIRECT CURRENT VOLTAGE CONVERSION CIRCUIT AND LIQUID CRYSTAL DISPLAY DEVICE

CROSS REFERENCE

The claims of this application have submitted to the State Intellectual Property Office of the People's Republic of China (SIPO) on May 31, 2016, Application No. 201610377391.8. The priority right based on the China application has a title of "Direct current voltage conversion circuit and liquid crystal display device". The entire contents of the above-mentioned patent application will be incorporated in the present application through citing.

FIELD OF THE INVENTION

The present invention relates to a display field, and more particularly to a direct-current voltage conversion circuit and a liquid crystal display device.

BACKGROUND OF THE INVENTION

Along with the development of the display technology, because the liquid crystal display device has advantages of small size, low power consumption and so on such that the liquid crystal display device is favored by many users. The liquid crystal display device generally includes a circuit board, a backlight module and a liquid crystal panel. The circuit board is used for driving the backlight module and the liquid crystal panel. The backlight module is used for providing light to the liquid crystal panel. The liquid crystal display panel is used for displaying information of text, picture, etc. the circuit board usually includes a direct-current voltage conversion circuit in order to convert a received first direct-current voltage to a second direct-current voltage, and outputting the second direct0current voltage. Wherein, the first direct-current voltage is not equal to the second direct-current voltage. When the first direct-current voltage is greater than the second direct-current voltage, the direct-current voltage conversion circuit is a buck circuit. When the first direct-current voltage is less than the second direct-current voltage, the direct-current voltage conversion circuit is a boost circuit. However, the voltage conversion circuit in the conventional art does not include an abnormal (for example, the voltage conversion circuit is short with respect to a ground) detection circuit. When the voltage conversion circuit generates an abnormality, the current passing through the electric elements in the voltage conversion circuit will exceed a preset current (such as a rated operating current) so that the electric elements in the voltage conversion circuit are burned.

SUMMARY OF THE INVENTION

The present invention provides a direct-current voltage conversion circuit, comprising a control chip, a conversion circuit and a protection circuit, wherein, the control chip is electrically connected to the conversion circuit, the control chip generates a control signal and an original voltage signal; the conversion circuit receives the control signal and the original voltage signal, and under a controlling of the control signal, obtaining a direct-current voltage signal according to the original voltage signal; the protection circuit detects if the conversion circuit generates an abnormality according to the direct-current voltage signal, and turning off the conversion circuit when the conversion circuit generates the abnormality.

Wherein, the protection circuit includes a detection circuit, a determination circuit and a control circuit; the detection circuit detects a feedback voltage of the conversion circuit; the determination circuit receives the feedback voltage, comparing the feedback voltage with a preset voltage, and determining if the conversion circuit generates the abnormality according to a comparison result of the feedback voltage and the preset voltage; when the determination circuit determines that the conversion circuit generates the abnormality, the control circuit controls the control chip to turn off the conversion circuit.

Wherein, the detection circuit includes a detection input terminal and a detection output terminal; the detection input terminal is electrically connected with the conversion circuit, used for receiving the feedback voltage, and the feedback voltage is outputted through the detection output terminal.

Wherein, the determination circuit includes a first thin-film transistor, a second thin-film transistor, a third thin-film transistor, a fourth thin-film transistor, a first resistor, a second resistor, a third resistor and a first operational amplifier; the first operational amplifier includes a first input terminal, a second input terminal and a first output terminal;

a gate of the first thin-film transistor receives a first gate control signal, a drain of the first thin-film transistor functions as an output terminal of the determination circuit and is electrically connected to the detection output terminal; a source of the first thin-film transistor sequentially connects with the first resistor, the second resistor and a ground; a gate of the second thin-film transistor is electrically connected to a drain of the third thin-film transistor, a drain of the second thin-film transistor is electrically connected to the first input terminal, and a source of the second thin-film transistor is electrically connected to a node between the first resistor and the second resistor; and a gate of the third thin-film transistor is electrically connected to the first output terminal, and a source of the third thin-film transistor is electrically connected to the ground; a gate of the fourth thin-film transistor is electrically connected to the gate of the third thin-film transistor, a drain of the fourth thin-film transistor functions as an output terminal of the determination circuit, a source of the fourth thin-film transistor is electrically connected to the node between the first resistor and the second resistor; a terminal of the third resistor receives a first voltage, the other terminal of the third resistor is electrically connected to the gate of the second thin-film transistor; the second input terminal of the first operational amplifier receives a first reference voltage; the node between the first resistor and the second resistor is named as a first detection voltage; when the first detection voltage is less than the first reference voltage, the conversion circuit generates the abnormality, the first output terminal outputs a first output signal having a low voltage level, the third thin-film transistor and the fourth thin-film transistor are turned off.

Wherein, when the first detection voltage is greater than the first reference voltage, the conversion circuit is normal, the first output terminal outputs the first output signal having a high voltage level, the first thin-film transistor is turned on under a controlling of the first gate control signal, the second thin-film transistor is turned off, the third thin-film transistor and the fourth thin-film transistor are turned on.

Wherein, the control circuit includes a second operational amplifier and a waveform controller; the second operational amplifier includes a third input terminal, a fourth input terminal and a second output terminal; the third input terminal functions as an input terminal of the control circuit, the third input terminal is electrically connected to the output terminal of the determination circuit; the fourth input terminal receives the second reference voltage; the second operational amplifier generates a second output signal according to a voltage signal applied on the third input terminal and the second reference voltage; the second output signal is outputted through the second output terminal; when the conversion circuit generates the abnormality, the second output signal controls the waveform controller to turn off an output channel of the original voltage signal.

Wherein, when the conversion circuit is normal, the second output signal controls the waveform controller to output a first square wave signal and a second square wave signal; the control chip obtains the original voltage signal according to the first square wave signal and the second square wave signal.

Wherein, the protection circuit further includes a timer, a current source, a fifth thin-film transistor and sixth thin-film transistor and a fourth resistor; the timer includes a timing input terminal and a timing output terminal; the timing output terminal is electrically connected to a gate of the fifth thin-film transistor, and the timing output terminal is electrically connected to the gate of the first thin-film transistor; a drain of the fifth thin-film transistor is electrically connected to a gate of the sixth thin-film transistor, a source of the fifth thin-film transistor is connected to the ground; a drain of the sixth thin-film transistor is electrically connected to the current source, and being applied with the first voltage through the current source; a source of the sixth thin-film transistor is electrically connected to the input terminal of the determination circuit; a terminal of the fourth resistor is electrically connected to a drain of the fifth thin-film transistor, the other terminal of the fourth resistor is applied with the first voltage;

the conversion circuit includes a first capacitor, a fifth resistor and a sixth resistor; a terminal of the first capacitor is connected to the ground, and the other terminal of the first capacitor is electrically connected to the detection input terminal; a terminal of the fifth resistor is connected to the ground, the other terminal of the fifth resistor is electrically connected to the detection input terminal; a terminal of the sixth resistor is electrically connected to the detection input terminal, and the other terminal of the sixth resistor is electrically connected to the output terminal of the conversion circuit; and when the timing input terminal receives a high voltage signal, triggering the timer to start calculating time, and the timing output terminal outputs a timing output signal having a low voltage level; at this time, the first thin-film transistor and the fifth thin-film transistor are turned off, the sixth thin-film transistor is turned on, and the current source charges the first capacitor; when calculating time by the timer is finished, the timer outputs the timing output signal having a high voltage level; the first thin-film transistor and the fifth thin-film transistor are turned on, the sixth thin-film transistor is turned off, the charging for the first capacitor is finished, and triggering the detection circuit to start working.

Wherein, the abnormality generated by the conversion circuit includes that the output terminal of the conversion circuit is short with respect to a ground.

The present invention also provides a liquid crystal display device, and the liquid crystal display device includes the direct-current voltage conversion circuit described in anyone of the above embodiments.

Comparing to the conventional art, the direct-current voltage conversion circuit of the present invention includes a control chip, a conversion circuit and a protection circuit, wherein, the control chip is electrically connected to the conversion circuit, the control chip generates a control signal and an original voltage signal; the conversion circuit receives the control signal and the original voltage signal, and under a controlling of the control signal, obtaining a direct-current voltage signal according to the original voltage signal; the protection circuit detects if the conversion circuit generates an abnormality according to the direct-current voltage signal, and turning off the conversion circuit when the conversion circuit generates the abnormality. In the present embodiment, the abnormality of the conversion circuit includes but not limited that the output terminal of the conversion circuit has a short circuit with respect to a ground. Accordingly, the direct-current voltage conversion circuit can turn off the direct-current conversion circuit when the conversion generates the abnormality in order to protect the electric elements in the direct-current conversion circuit from being burned.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
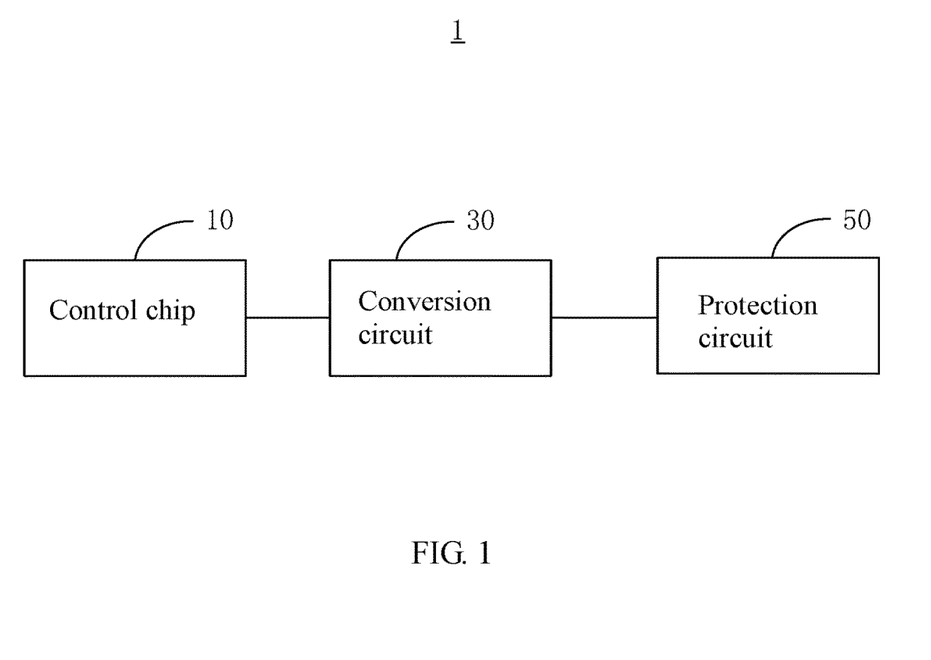
FIG. 1 is a circuit block diagram of a direct-current voltage conversion circuit of a preferred embodiment of the present invention.
Figure 2:
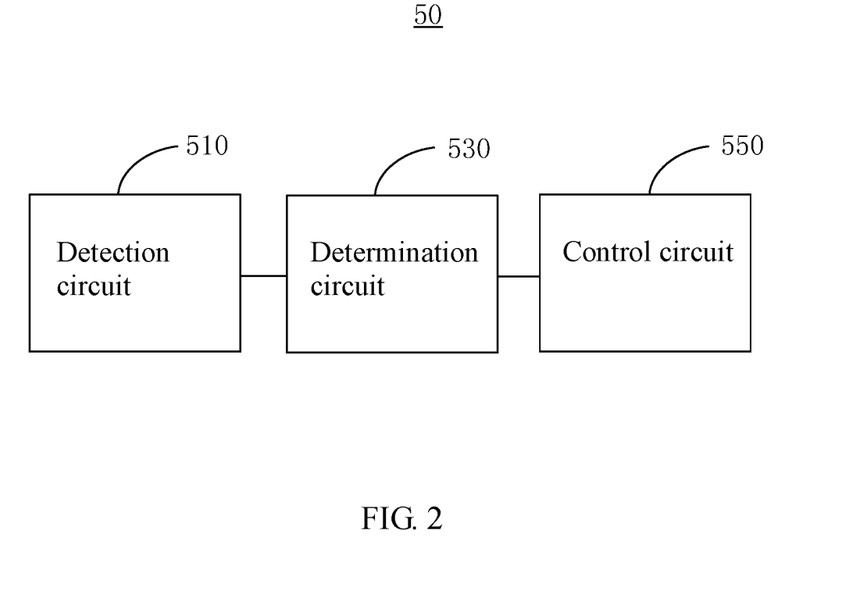
FIG. 2 is a circuit block diagram of a protection circuit in the direct-current voltage conversion circuit of a preferred embodiment of the present invention.
Figure 3:
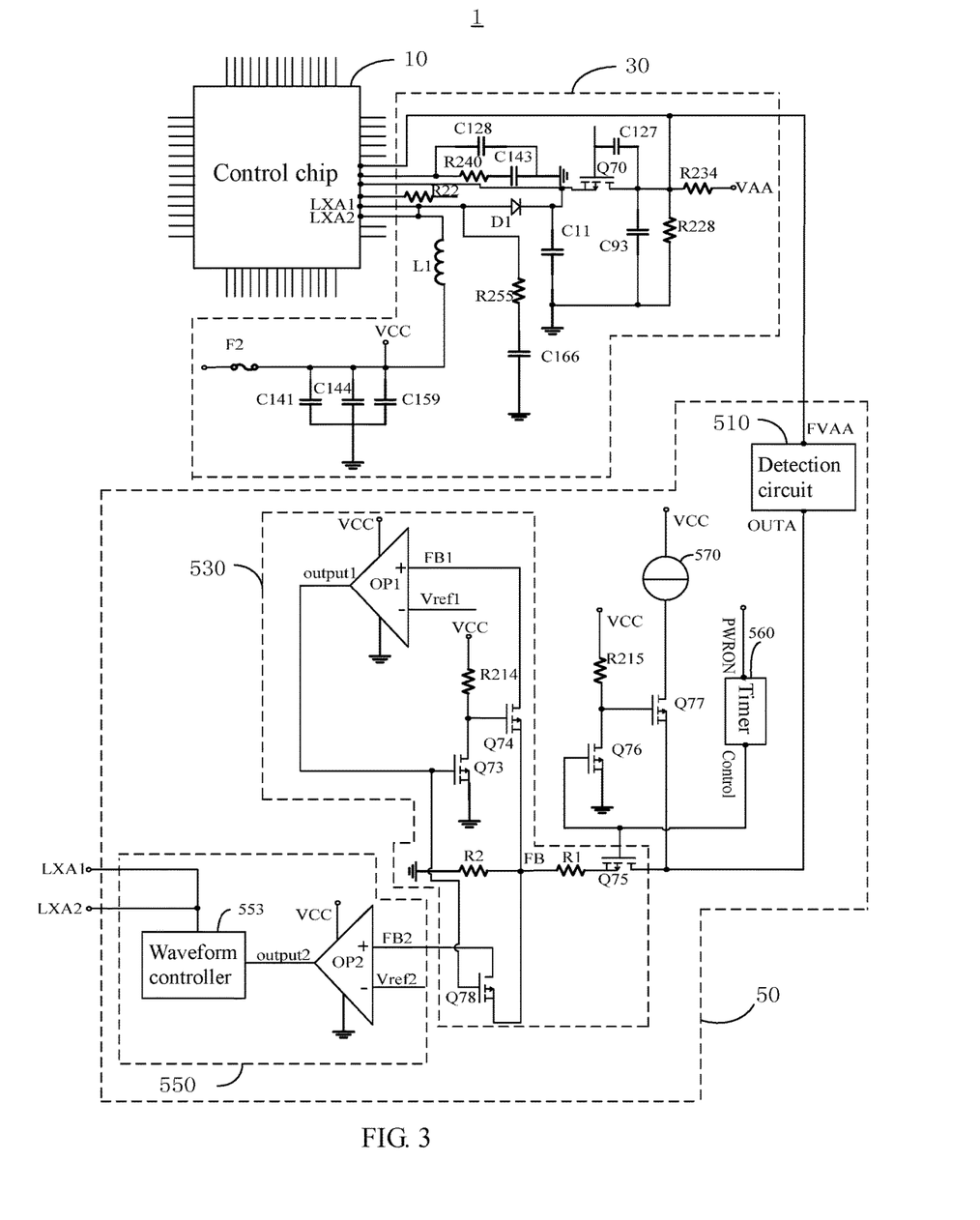
FIG. 3 is a schematic circuit diagram of the direct-current voltage conversion circuit of a preferred embodiment of the present invention.

With reference to FIG. 1, FIG. 2 and FIG. 3, wherein, FIG. 1 is a circuit block diagram of a direct-current voltage conversion circuit of a preferred embodiment of the present invention; FIG. 2 is a circuit block diagram of a protection circuit of the direct-current voltage conversion circuit of a preferred embodiment of the present invention, FIG. 3 is a schematic circuit diagram of the direct-current voltage conversion circuit of a preferred embodiment of the present invention.

The direct-current voltage conversion circuit 1 includes a control chip 10, a conversion circuit 30 and a protection circuit 50. The control chip 10 is electrically connected to the conversion circuit 30, the control chip 10 generates a control signal and an original voltage signal. The conversion circuit 30 receives the control signal and the original voltage signal, and under the controlling of the control signal, obtaining a direct-current voltage signal according to the original voltage signal. The direct-current voltage signal is outputted through an output terminal of the conversion circuit 30. The protection circuit 50 detects if the conversion circuit 30 generates an abnormality according to the direct-current voltage signal, and when the conversion circuit 30 generates an abnormality, the protection circuit 50 turns off the conversion circuit 30. In the present embodiment, the abnormality of the conversion circuit 30 includes but not limited that the output terminal of the conversion circuit 30 is short with respect to a ground.

The protection circuit 50 includes a detection circuit 510, a determination circuit 530 and a control circuit 550. The detection circuit 510 is electrically connected to the conversion 30, and detecting a feedback voltage of the conversion circuit 30. Wherein, the feedback voltage can be obtained according to the direct-current voltage signal. The determination circuit 530 is electrically connected with the detection circuit 510. The determination circuit 530 receives the feedback voltage, comparing the feedback voltage with a preset voltage, and determining if the conversion circuit 30 generates the abnormality according to a comparison result of the feedback voltage and the preset voltage. The control circuit 550 is electrically connected with the determination circuit 530, and when the determination circuit 530 determines that the conversion circuit 30 generates the abnormality, the control circuit 550 controls the control chip 10 to turn off the conversion circuit 30. Wherein, an input terminal of the detection circuit 510 is an input terminal of the protection circuit 50. An output terminal of the control circuit 550 is an output terminal of the protection circuit 50.

The detection circuit 510 includes a detection input terminal FVAA and a detection output terminal OUTA. The detection input terminal FVAA is electrically connected with the conversion circuit 30, used for receiving the feedback voltage. The feedback voltage is outputted through the detection output terminal OUTA.

The determination circuit 530 includes a first thin-film transistor Q75, a second thin-film transistor Q74, a third thin-film transistor Q73, a fourth thin-film transistor Q78, a first resistor R1, a second resistor R2, a third resistor R214 and a first operational amplifier OP1. The first operational amplifier OP1 includes a first input terminal FB1, a second input terminal Vref1 and a first output terminal output1.

A gate of the first thin-film transistor Q75 receives a first gate control signal, a drain of the first thin-film transistor Q75 functions as an output terminal of the determination circuit 530 and is electrically connected to the detection output terminal OUTA. A source of the first thin-film transistor Q75 sequentially connects with the first resistor R1, the second resistor R2 and a ground. A gate of the second thin-film transistor Q74 is electrically connected to a drain of the third thin-film transistor Q73, a drain of the second thin-film transistor Q74 is electrically connected to the first input terminal FB1, and a source of the second thin-film transistor Q74 is electrically connected to a node FB between the first resistor R1 and the second resistor R2.

A gate of the third thin-film transistor Q73 is electrically connected to the first output terminal output1, and a source of the third thin-film transistor Q73 is electrically connected to the ground. A gate of the fourth thin-film transistor Q78 is electrically connected to the gate of the third thin-film transistor Q73, a drain of the fourth thin-film transistor Q78 functions as an output terminal of the determination circuit 530, a source of the fourth thin-film transistor Q78 is electrically connected to the node FB between the first resistor R1 and the second resistor R2. A terminal of the third resistor R214 receives a first voltage VCC, the other terminal of the third resistor R214 is electrically connected to the gate of the second thin-film transistor Q74. The second input terminal Vref1 of the first operational amplifier OP1 receives a first reference voltage. The node FB between the first resistor R1 and the second resistor R2 is named as a first detection voltage. When the first detection voltage is less than the first reference voltage, the conversion circuit 30 generates the abnormality, the first output terminal output1 outputs a first output signal having a low voltage level, the third thin-film transistor Q73 and the fourth thin-film transistor Q78 are turned off.

When the first detection voltage is greater than the first reference voltage, the conversion circuit 30 is normal, the first output terminal output1 outputs the first output signal having a high voltage level, the first thin-film transistor Q75 is turned on under a controlling of the first gate control signal, the second thin-film transistor Q74 is turned off, the third thin-film transistor Q73 and the fourth thin-film transistor Q78 are turned on.

The control circuit 550 includes a second operational amplifier OP2 and a waveform controller 553. The second operational amplifier OP2 includes a third input terminal FB2, a fourth input terminal Vref2 and a second output terminal output2. The third input terminal FB2 functions as an input terminal of the control circuit 550, the third input terminal FB2 is electrically connected to the output terminal of the determination circuit 530. The fourth input terminal Vref2 receives the second reference voltage. The second operational amplifier OP2 generates a second output signal according to a voltage signal applied on the third input terminal FB2 and the second reference voltage. The second output signal is outputted through the second output terminal output2. When the conversion circuit 30 generates the abnormality, the second output signal controls the waveform controller 553 to turn off an output channel of the original voltage signal.

When the conversion circuit 30 is normal, the second output signal controls the waveform controller 553 to output a first square wave signal and a second square wave signal. The control chip 10 obtains the original voltage signal according to the first square wave signal and the second square wave signal. Specifically, a terminal marked as LXA1 in the control chip 10 is electrically connected to a terminal marked as LXA1 in the waveform controller 553. A terminal marked as LXA2 in the control chip 10 is electrically connected to a terminal marked as LXA2 in the waveform controller 553. The first square wave signal is outputted to the terminal LXA 1 of the control chip 10 through the terminal LXA 1 of the waveform controller 553, the second square wave signal is outputted to the terminal LXA 2 of the control chip 10 through the terminal LXA 2 of the waveform controller 553.

The protection circuit 50 further includes a timer 560, a current source 570, a fifth thin-film transistor Q76 and sixth thin-film transistor Q77 and a fourth resistor R215. The timer 560 includes a timing input terminal PWRON and a timing output terminal Control. The timing output terminal PWRON is electrically connected to a gate of the fifth thin-film transistor Q76, and the timing output terminal PWRON is electrically connected to the gate of the first thin-film transistor Q75. A drain of the fifth thin-film transistor Q76 is electrically connected to a gate of the sixth thin-film transistor Q77, a source of the fifth thin-film transistor Q76 is connected to the ground. A drain of the sixth thin-film transistor Q77 is electrically connected to the current source 570, and being applied with the first voltage through the current source 570. A source of the sixth thin-film transistor Q77 is electrically connected to the input terminal of the determination circuit 530. A terminal of the fourth resistor R215 is electrically connected to a drain of the fifth thin-film transistor Q76, the other terminal of the fourth resistor R215 is applied with the first voltage VCC.

Correspondingly, the conversion circuit 30 includes a first capacitor C93, a fifth resistor R228 and a sixth resistor R234. A terminal of the first capacitor C93 is connected to the ground, and the other terminal of the first capacitor C93 is electrically connected to the detection input terminal FVAA. A terminal of the fifth resistor R228 is connected to the ground, the other terminal of the fifth resistor R228 is electrically connected to the detection input terminal FVAA. A terminal of the sixth resistor R234 is electrically connected to the detection input terminal FVAA, and the other terminal of the sixth resistor R234 is electrically connected to the output terminal VAA of the conversion circuit 30.

When the timing input terminal PWRON receives a high voltage signal, triggering the timer 560 to start calculating time, and the timing output terminal Control outputs a timing output signal having a low voltage level. At this time, the first thin-film transistor Q75 and the fifth thin-film transistor Q76 are turned off, the sixth thin-film transistor Q77 is turned on, and the current source 570 charges the first capacitor C93.

When calculating time by the timer 560 is finished, the timer 560 outputs the timing output signal having a high voltage level. The first thin-film transistor Q75 and the fifth thin-film transistor Q76 are turned on, the sixth thin-film transistor Q77 is turned off, the charging for the first capacitor C93 is finished, and triggering the detection circuit 510 to start working. That is, triggering the detection circuit 510 to detect the feedback voltage of the conversion circuit 30.

In the present embodiment, the abnormality generated by the conversion circuit 30 includes that the output terminal VAA of the conversion circuit 30 is short with respect to the ground.

In the present embodiment, the voltage of the high voltage signal is greater than a first preset threshold voltage, for example, the first preset threshold voltage can be 3.3V or 5V. The voltage of the low voltage signal is less than a second preset threshold voltage, for example, the second preset threshold voltage can be 3.3V.

Comparing to the conventional technology, the direct-current voltage conversion circuit 1 of the present invention includes a control chip 10, a conversion circuit 30 and a protection circuit 50. The control chip 10 is electrically connected to the conversion circuit 30, the control chip 10 generates a control signal and an original voltage signal. The conversion circuit 30 receives the control signal and the original voltage signal, and under the controlling of the control signal, obtaining a direct-current voltage signal according to the original voltage signal. The direct-current voltage signal is outputted through an output terminal of the conversion circuit 30. The protection circuit 50 detects if the conversion circuit 30 generates an abnormality according to the direct-current voltage signal, and when the conversion circuit 30 generates an abnormality, the protection circuit 50 turns off the conversion circuit 30. In the present embodiment, the abnormality of the conversion circuit 30 includes but not limited to that the output terminal of the conversion circuit 30 is short with respect to the ground. Accordingly, the direct-current voltage conversion circuit 1 can turn off the conversion circuit 30 when the conversion circuit generated the abnormality in order to protect electrical elements in the conversion circuit 30 from being burned.

Figure 4:
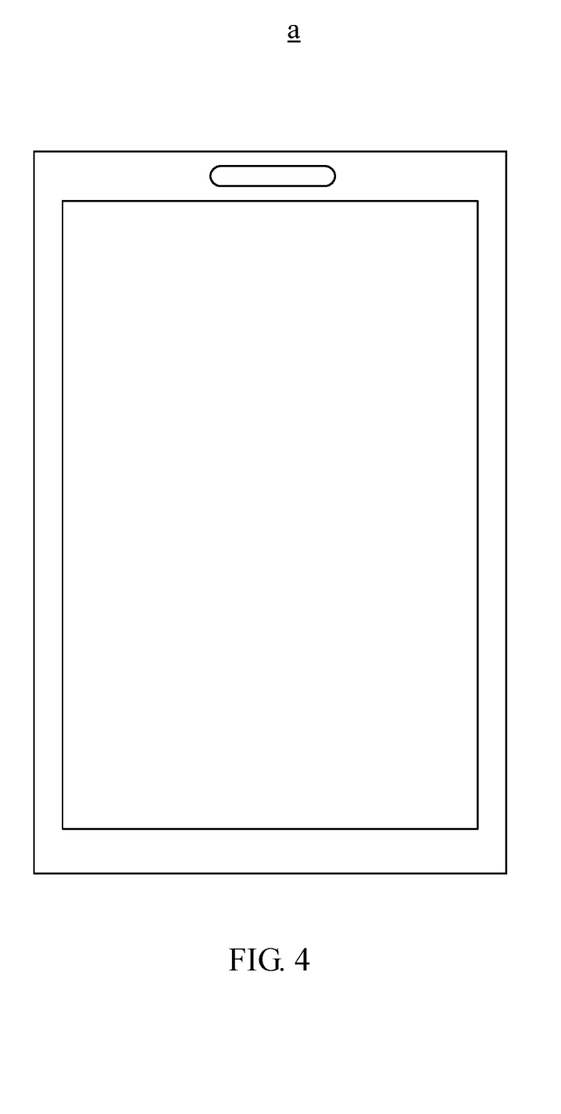
FIG. 4 is a schematic structure diagram of a liquid crystal display device of a preferred embodiment of the present invention.

The present invention also provides a liquid crystal display device "a", with reference to FIG. 4, and FIG. 4 is a schematic structure diagram of a liquid crystal display device of a preferred embodiment of the present invention. The liquid crystal display device "a" includes the common voltage conversion circuit of the liquid crystal display panel described above, no more repeating here. In the present embodiment, the application of the liquid crystal display device "a" includes but not limited to smart phone, Mobile Internet Device (MID), E-books, tablet, play Station Portable (PSP) or Personal Digital Assistant (PDA), etc.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A direct-current voltage conversion circuit, comprising a control chip, a conversion circuit and a protection circuit, wherein, the control chip is electrically connected to the conversion circuit, the control chip generates a control signal and an original voltage signal; the conversion circuit receives the control signal and the original voltage signal, and under a controlling of the control signal, obtaining a direct-current voltage signal according to the original voltage signal; the protection circuit detects if the conversion circuit generates an abnormality according to the direct-current voltage signal, and turning off the conversion circuit when the conversion circuit generates the abnormality; and
    wherein the protection circuit includes a detection circuit, a determination circuit and a control circuit; the detection circuit detects a feedback voltage of the conversion circuit; the determination circuit receives the feedback voltage, comparing the feedback voltage with a preset voltage, and determining if the conversion circuit generates the abnormality according to a comparison result of the feedback voltage and the preset voltage; when the determination circuit determines that the conversion circuit generates the abnormality, the control circuit controls the control chip to turn off the conversion circuit.

2. The direct-current voltage conversion circuit according to claim 1, wherein, the detection circuit includes a detection input terminal and a detection output terminal; the detection input terminal is electrically connected with the conversion circuit, used for receiving the feedback voltage, and the feedback voltage is outputted through the detection output terminal.

3. The direct-current voltage conversion circuit according to claim 2, wherein the determination circuit includes a first thin-film transistor, a second thin-film transistor, a third thin-film transistor, a fourth thin-film transistor, a first resistor, a second resistor, a third resistor and a first operational amplifier; the first operational amplifier includes a first input terminal, a second input terminal and a first output terminal;
    a gate of the first thin-film transistor receives a first gate control signal, a drain of the first thin-film transistor functions as an output terminal of the determination circuit and is electrically connected to the detection output terminal; a source of the first thin-film transistor sequentially connects with the first resistor, the second resistor and a ground; a gate of the second thin-film transistor is electrically connected to a drain of the third thin-film transistor, a drain of the second thin-film transistor is electrically connected to the first input terminal, and a source of the second thin-film transistor is electrically connected to a node between the first resistor and the second resistor; and a gate of the third thin-film transistor is electrically connected to the first output terminal, and a source of the third thin-film transistor is electrically connected to the ground; a gate of the fourth thin-film transistor is electrically connected to the gate of the third thin-film transistor, a drain of the fourth thin-film transistor functions as an output terminal of the determination circuit, a source of the fourth thin-film transistor is electrically connected to the node between the first resistor and the second resistor; a terminal of the third resistor receives a first voltage, the other terminal of the third resistor is electrically connected to the gate of the second thin-film transistor; the second input terminal of the first operational amplifier receives a first reference voltage; the node between the first resistor and the second resistor is named as a first detection voltage; when the first detection voltage is less than the first reference voltage, the conversion circuit generates the abnormality, the first output terminal outputs a first output signal having a low voltage level, the third thin-film transistor and the fourth thin-film transistor are turned off.

4. The direct-current voltage conversion circuit according to claim 3, wherein when the first detection voltage is greater than the first reference voltage, the conversion circuit is normal, the first output terminal outputs the first output signal having a high voltage level, the first thin-film transistor is turned on under a controlling of the first gate control signal, the second thin-film transistor is turned off, the third thin-film transistor and the fourth thin-film transistor are turned on.

5. The direct-current voltage conversion circuit according to claim 4, wherein the control circuit includes a second operational amplifier and a waveform controller; the second operational amplifier includes a third input terminal, a fourth input terminal and a second output terminal; the third input terminal functions as an input terminal of the control circuit, the third input terminal is electrically connected to the output terminal of the determination circuit; the fourth input terminal receives the second reference voltage; the second operational amplifier generates a second output signal according to a voltage signal applied on the third input terminal and the second reference voltage; the second output signal is outputted through the second output terminal; when the conversion circuit generates the abnormality, the second output signal controls the waveform controller to turn off an output channel of the original voltage signal.

6. The direct-current voltage conversion circuit according to claim 5, wherein when the conversion circuit is normal, the second output signal controls the waveform controller to output a first square wave signal and a second square wave signal; the control chip obtains the original voltage signal according to the first square wave signal and the second square wave signal.

7. The direct-current voltage conversion circuit according to claim 3, wherein the protection circuit further includes a timer, a current source, a fifth thin-film transistor and sixth thin-film transistor and a fourth resistor; the timer includes a timing input terminal and a timing output terminal; the timing output terminal is electrically connected to a gate of the fifth thin-film transistor, and the timing output terminal is electrically connected to the gate of the first thin-film transistor; a drain of the fifth thin-film transistor is electrically connected to a gate of the sixth thin-film transistor, a source of the fifth thin-film transistor is connected to the ground; a drain of the sixth thin-film transistor is electrically connected to the current source, and being applied with the first voltage through the current source; a source of the sixth thin-film transistor is electrically connected to the input terminal of the determination circuit; a terminal of the fourth resistor is electrically connected to a drain of the fifth thin-film transistor, the other terminal of the fourth resistor is applied with the first voltage;

the conversion circuit includes a first capacitor, a fifth resistor and a sixth resistor; a terminal of the first capacitor is connected to the ground, and the other terminal of the first capacitor is electrically connected to the detection input terminal; a terminal of the fifth resistor is connected to the ground, the other terminal of the fifth resistor is electrically connected to the detection input terminal; a terminal of the sixth resistor is electrically connected to the detection input terminal, and the other terminal of the sixth resistor is electrically connected to the output terminal of the conversion circuit; and when the timing input terminal receives a high voltage signal, triggering the timer to start calculating time, and the timing output terminal outputs a timing output signal having a low voltage level; at this time, the first thin-film transistor and the fifth thin-film transistor are turned off, the sixth thin-film transistor is turned on, and the current source charges the first capacitor; when calculating time by the timer is finished, the timer outputs the timing output signal having a high voltage level; the first thin-film transistor and the fifth thin-film transistor are turned on, the sixth thin-film transistor is turned off, the charging for the first capacitor is finished, and triggering the detection circuit to start working.

8. The direct-current voltage conversion circuit according to claim 1, wherein the abnormality generated by the conversion circuit includes that the output terminal of the conversion circuit is short with respect to a ground.

9. A liquid crystal display device, including a direct-current voltage conversion circuit, and the direct-current voltage conversion circuit comprises a control chip, a conversion circuit and a protection circuit, wherein, the control chip is electrically connected to the conversion circuit, the control chip generates a control signal and an original voltage signal; the conversion circuit receives the control signal and the original voltage signal, and under a controlling of the control signal, obtaining a direct-current voltage signal according to the original voltage signal; the protection circuit detects if the conversion circuit generates an abnormality according to the direct-current voltage signal, and turning off the conversion circuit when the conversion circuit generates the abnormality; and wherein the protection circuit includes a detection circuit, a determination circuit and a control circuit; the detection circuit detects a feedback voltage of the conversion circuit; the determination circuit receives the feedback voltage, comparing the feedback voltage with a preset voltage, and determining if the conversion circuit generates the abnormality according to a comparison result of the feedback voltage and the preset voltage; when the determination circuit determines that the conversion circuit generates the abnormality, the control circuit controls the control chip to turn off the conversion circuit.

10. The liquid crystal display device according to claim 9, wherein the detection circuit includes a detection input terminal and a detection output terminal; the detection input terminal is electrically connected with the conversion circuit, used for receiving the feedback voltage, and the feedback voltage is outputted through the detection output terminal.

11. The liquid crystal display device according to claim 10, wherein the determination circuit includes a first thin-film transistor, a second thin-film transistor, a third thin-film transistor, a fourth thin-film transistor, a first resistor, a second resistor, a third resistor and a first operational amplifier; the first operational amplifier includes a first input terminal, a second input terminal and a first output terminal; and a gate of the first thin-film transistor receives a first gate control signal, a drain of the first thin-film transistor functions as an output terminal of the determination circuit and is electrically connected to the detection output terminal; a source of the first thin-film transistor sequentially connects with the first resistor, the second resistor and a ground; a gate of the second thin-film transistor is electrically connected to a drain of the third thin-film transistor, a drain of the second thin-film transistor is electrically connected to the first input terminal, and a source of the second thin-film transistor is electrically connected to a node between the first resistor and the second resistor; a gate of the third thin-film transistor is electrically connected to the first output terminal, and a source of the third thin-film transistor is electrically connected to the ground; a gate of the fourth thin-film transistor is electrically connected to the gate of the third thin-film transistor, a drain of the fourth thin-film transistor functions as an output terminal of the determination circuit, a source of the fourth thin-film transistor is electrically connected to the node between the first resistor and the second resistor; a terminal of the third resistor receives a first voltage, the other terminal of the third resistor is electrically connected to the gate of the second thin-film transistor; the second input terminal of the first operational amplifier receives a first reference voltage; the node between the first resistor and the second resistor is named as a first detection voltage; when the first detection voltage is less than the first reference voltage, the conversion circuit generates the abnormality, the first output terminal outputs a first output signal having a low voltage level, the third thin-film transistor and the fourth thin-film transistor are turned off.

12. The liquid crystal display device according to claim 11, wherein when the first detection voltage is greater than the first reference voltage, the conversion circuit is normal, the first output terminal outputs the first output signal having a high voltage level, the first thin-film transistor is turned on under a controlling of the first gate control signal, the second thin-film transistor is turned off, the third thin-film transistor and the fourth thin-film transistor are turned on.

13. The liquid crystal display device according to claim 12, wherein the control circuit includes a second operational amplifier and a waveform controller; the second operational amplifier includes a third input terminal, a fourth input terminal and a second output terminal; the third input terminal functions as an input terminal of the control circuit, the third input terminal is electrically connected to the output terminal of the determination circuit; the fourth input terminal receives the second reference voltage; the second operational amplifier generates a second output signal according to a voltage signal applied on the third input terminal and the second reference voltage; the second output signal is outputted through the second output terminal; when the conversion circuit generates the abnormality, the second output signal controls the waveform controller to turn off an output channel of the original voltage signal.

14. The liquid crystal display device according to claim 13, wherein when the conversion circuit is normal, the second output signal controls the waveform controller to output a first square wave signal and a second square wave signal; the control chip obtains the original voltage signal according to the first square wave signal and the second square wave signal.

15. The liquid crystal display device according to claim 11, wherein the protection circuit further includes a timer, a current source, a fifth thin-film transistor and sixth thin-film transistor and a fourth resistor; the timer includes a timing input terminal and a timing output terminal; the timing output terminal is electrically connected to a gate of the fifth thin-film transistor, and the timing output terminal is electrically connected to the gate of the first thin-film transistor; a drain of the fifth thin-film transistor is electrically connected to a gate of the sixth thin-film transistor, a source of the fifth thin-film transistor is connected to the ground; a drain of the sixth thin-film transistor is electrically connected to the current source, and being applied with the first voltage through the current source; a source of the sixth thin-film transistor is electrically connected to the input terminal of the determination circuit; a terminal of the fourth resistor is electrically connected to a drain of the fifth thin-film transistor, the other terminal of the fourth resistor is applied with the first voltage;

the conversion circuit includes a first capacitor, a fifth resistor and a sixth resistor; a terminal of the first capacitor is connected to the ground, and the other terminal of the first capacitor is electrically connected to the detection input terminal; a terminal of the fifth resistor is connected to the ground, the other terminal of the fifth resistor is electrically connected to the detection input terminal; a terminal of the sixth resistor is electrically connected to the detection input terminal, and the other terminal of the sixth resistor is electrically connected to the output terminal of the conversion circuit; and when the timing input terminal receives a high voltage signal, triggering the timer to start calculating time, and the timing output terminal outputs a timing output signal having a low voltage level; at this time, the first thin-film transistor and the fifth thin-film transistor are turned off, the sixth thin-film transistor is turned on, and the current source charges the first capacitor; when calculating time by the timer is finished, the timer outputs the timing output signal having a high voltage level; the first thin-film transistor and the fifth thin-film transistor are turned on, the sixth thin-film transistor is turned off, the charging for the first capacitor is finished, and triggering the detection circuit to start working.

16. The liquid crystal display device according to claim 9, wherein the abnormality generated by the conversion circuit includes that the output terminal of the conversion circuit is short with respect to a ground.

* * * * *